United States Patent [19]
Dunn

[11] Patent Number: 6,077,081
[45] Date of Patent: Jun. 20, 2000

[54] FIREFIGHTING TRAINING METHOD AND APPARATUS

[76] Inventor: John B. Dunn, 205 Fairview Ave., Bogota, N.J. 07603

[21] Appl. No.: 08/890,759

[22] Filed: Jul. 11, 1997

[51] Int. Cl.[7] .................................................. G09B 19/00
[52] U.S. Cl. ......................... 434/226; 434/219; 434/365; 169/15
[58] Field of Search .............................. 434/226; 169/15; 239/391

[56] References Cited

U.S. PATENT DOCUMENTS

| | | | |
|---|---|---|---|
| D. 286,319 | 10/1986 | Mathis | D23/41 |
| D. 290,166 | 6/1987 | Jacuzzi | D23/42 |
| D. 348,924 | 7/1994 | Morrett | D23/261 |
| 1,797,954 | 3/1931 | Greenwald | 138/40 |
| 1,890,497 | 12/1932 | Dalgliesh | 138/40 |
| 3,704,831 | 12/1972 | Clark | 239/394 |
| 3,746,262 | 7/1973 | Bete | 239/458 |
| 3,772,637 | 11/1973 | Paullus et al. | 339/102 R |
| 3,943,312 | 3/1976 | Bernstein | 200/61.581 |
| 3,960,393 | 6/1976 | Hosokawa et al. | 285/137 R |
| 4,095,749 | 6/1978 | Campbell | 239/458 |
| 4,252,278 | 2/1981 | McMillan | 239/583 |
| 4,691,769 | 9/1987 | Flamm et al. | 165/158 |
| 4,830,790 | 5/1989 | Stevenson | 260/18.1 |
| 4,995,646 | 2/1991 | Johnston et al. | 285/137.1 |
| 5,417,371 | 5/1995 | Brackett | 239/391 |
| 5,445,226 | 8/1995 | Scott | 169/15 |
| 5,613,773 | 3/1997 | Scott | 365/163.2 |

*Primary Examiner*—Robert A. Hafer
*Assistant Examiner*—Bena B. Mill
*Attorney, Agent, or Firm*—Wolff & Samson

[57] ABSTRACT

A firefighting training apparatus is provided for simulating the pumping of water through various long lengths of hose to train firefighters to deliver a proper amount of water through the fire hose. The apparatus includes a disk having one or more apertures therethrough. The one or more apertures permit the passage of water through the disk while providing resistance to the water to simulate the resistance encountered by water flowing through a long length of fire hose. The firefighting training apparatus is used by placing the disk within the flow of water through the fire hose. A firefighter can practice delivering a proper amount of water through a fire hose to a nozzle without the need of using a long length of fire hose.

8 Claims, 3 Drawing Sheets

FIREFIGHTING TRAINING METHOD AND APPARATUS

BACKGROUND OF THE INVENTION

1. Field of the Invention

This invention generally relates to a training apparatus for firefighters, and more specifically, to a method and apparatus for training firefighters to deliver a proper amount of water through a given length of fire hose, without the need to lay out long lengths of fire hose during training exercises by inserting a disk into a fire hose to create a friction loss in the fire hose.

2. Related Art

Firefighting is a complex activity which involves a number of separate skills. As with any activity requiring a high level of skill, practice helps firefighters learn and improve these skills. One such skill is pumping a proper amount of water from a pump, through a given length of fire hose, to deliver a desired amount of water from the nozzle of the hose. To effectively combat fires, a specific quantity of water must be delivered to the nozzle of the hose. The volume of water delivered through fire hose is affected by the length of the fire hose used.

As water travels through the fire hose, it is slowed by the distributed frictional resistance encountered along the interior surface of the fire hose. The degree to which the water is slowed is sometimes referred to as "friction loss." Due to this friction loss, water pressure along the hose is gradually reduced. The water pressure loss due to friction loss is cumulative; the longer the hose, the more friction loss.

A fireman operating the pump which provides water must supply a proper amount of water from the water pump to the fire hose to overcome this friction loss in order to provide a proper volume of water to the nozzle. This is achieved by increasing water pressure from the pump as the length of the fire hose is increased.

When multiple lengths of fire hose are attached to create fire hoses of different lengths, the delivery of a proper volume of water becomes an especially complicated task. The only way for a firefighter to become proficient at this skill is to practice with hoses of different lengths. For this reason, each practice, or drill, usually involves several firefighters laying out several hundred feet of hose to simulate the conditions encountered under typical firefighting conditions. After the drill is completed, the fire hose must be picked-up.

If there were a way to simulate various long lengths of fire hose without actually laying out the lengths of the fire hose, it would greatly reduce the time spent for such practice sessions.

Accordingly, what is needed, and has not heretofore been provided, is a method and apparatus for simulating pumping water through a large length of fire hose without the necessity of laying out large lengths of fire hose.

Examples of previous efforts at manipulating water flow include:

Johnston et al., U.S. Pat. No. 4,995,646 (1991) discloses a connector assembly for permitting sealed passage of tubular lines through portions between separate chambers. The connector assembly comprises a first fitting body having a through passage for connection to one of the chambers. The through passage has an outwardly open end with a circumferentially and continuously conical mouth. A rigid disk member with a conical outer surface and regularly spaced circular openings is received in the conical mouth.

Flamm et al., U.S. Pat. No. 4,691,769 (1987) discloses a sealing means for shell and tube heat exchangers which only makes use of components which are external to the heat exchanger shell. These components mechanically compress a series of rubber type gaskets and incompressible tube sheets to thereby seal the tube to the tube sheet joints in such a manner to precisely control the degree of compression of the rubber type gaskets. Also, because the external components make use of the confining elements on the outer periphery of said gaskets, the need for periodically retightening the bolts is eliminated.

Hosokawa et al., U.S. Pat. No. 3,960,393 (1976) discloses a hose connector having a couple of connecting plates, a gasket pressed between the connecting plates, a pair of slightly curved plate pressures on the plates opposite to the gasket and fixing means for fixing the elements together.

Paullus et al., U.S. Pat. No. 3,772,637 (1973) discloses a device and method for sealing openings found on the rear faces of electrical connectors from which a number of electrical leads emanate. The invention is achieved by a layer of sealable material, such as an epoxy resin, attached to a rigid member to form a disk. Once formed, the disk can be pressed into a recess in the rear face of the connector, the pressure causing the material to flow into passageways and openings and sealing the electrical leads therein.

Dalgliesh, U.S. Pat. No. 1,890,497 (1932) discloses an apparatus for affecting the physical condition of gases comprising a circular plate with a plurality of perforations. The perforations are each sized to a diameter of 3–32 of an inch and are closely spaced to occupy substantially 62.5 percent of the total exposed area of the surface of a circular plate. The total area of the perforations cannot be increased beyond 70 percent or reduced below 50 percent without losing the advantages of the invention.

Greenwald, U.S. Pat. No. 1,797,954 (1931) discloses a refrigerant control which replaces a float valve and filter combination with a single means that is capable of serving as a filter and of giving equivalent resistance to that of a capillary tube or float chamber to control the supply of refrigerant from the condensing means to the cooling means of the apparatus.

Merrett, U.S. Design Pat. No. 348,924 (1994) discloses an ornamental design for a snap-in strainer. The design is comprised of a regular pattern of circular holes formed on a curved surface of a circular plate. Three connecting snaps are regularly spaced about the circumference of the strainer.

Jacuzzi, U.S. Design Pat. No. 290,166 (1987) discloses an ornamental design for a suction fitting for a hydrotherapy spa. The design is comprised of rows of regularly spaced slots circularly formed on the upper flat portion of a cylindrical surface and three rows of circular holes formed along the cylinder's curved surface. On the flat upper portion of the cylinder, the design provides space for two screws.

Mathis, U.S. Design Pat. No. 286,319 (1986) discloses an ornamental design for a guard for a water suction pipe having a plurality of circular holes formed on an upper surface. The guard is screwed into an interior threaded pipe.

None of these previous efforts disclose all of the benefits of the present invention, nor do these previous patents teach or suggest all of the elements of the present invention.

OBJECTS AND SUMMARY OF THE INVENTION

It is a primary object of the present invention to provide a firefighting training apparatus.

It is another object of the present invention to provide a firefighting training apparatus to train a fire fighter to operate a pumper to deliver a proper amount of water through given length of fire hose.

It is an additional object of the present invention to provide a method and apparatus for simulating the pumping of water through a long length of hose, without the need for laying out a long length of hose.

It is also an object of the present invention to provide a firefighting training apparatus that creates friction loss in water within a fire hose to simulate the characteristics of a long length of fire hose.

It is still also an object of the present invention to provide a firefighting training apparatus to train firefighters to become skilled in the delivery of water through multiple lengths of fire hoses.

It is another object of the present invention to provide a firefighting training apparatus in the form of a disk having a plurality of apertures which can be positioned within the hose or between a pumper and the hose, or between a nozzle and the hose.

It is even another object of the present invention to provide firefighting training apparatus in the form of a disk which partially obstructs the flow of water through the fire hose, to simulate the flow of water through a long length of fire hose.

It is yet another object of the present invention to provide a firefighting training apparatus in the form of a disk with apertures, wherein disks with apertures of different sizes can be used to simulate different lengths of a fire hose.

It is also an object of the present invention to provide a firefighting training apparatus in the form of a disk with apertures, wherein disks with different numbers of apertures can be used to simulate different lengths of a fire hose.

It is also an object of the present invention to provide a firefighting training apparatus in the form of a disk with apertures, wherein disks with the apertures in different positions can be used in to simulate different lengths of a fire hose.

It is another object of the present invention to provide a firefighting training apparatus that is relatively easy to manufacture.

It is also an object of the present invention to provide a firefighting training apparatus which saves time.

It is even an additional object of the present invention to provide a fire fighting training method and apparatus which is easy to use.

These and other objects are achieved by the firefighting training apparatus of the present invention for simulating the pumping of water through various long lengths of hose to train firefighters to deliver a proper amount of water through the fire hose. The apparatus comprises a disk having one or more apertures therethrough. The one or more apertures permit the passage of water through the disk while providing an amount of friction equal to that encountered by water flowing through a long length of fire hose to simulate the use of a long fire hose. The firefighting training apparatus is used by placing the disk within the flow of water through the fire hose. The disk could be positioned at the connection of the hose to a pumper, at the connection of a nozzle to the hose, or at any other location where there is a coupling.

BRIEF DESCRIPTION OF THE DRAWINGS

Other important objects and features of the invention will be apparent from the following Detailed Description of the Invention when read in context with the accompanying drawings in which.

DETAILED DESCRIPTION OF THE INVENTION

The present invention relates to a firefighting training method and apparatus. The apparatus comprises a disk having one or more apertures therethrough. The disk is inserted within a hose to simulate the frictional resistance encountered by water flowing through a long length of fire hose. This apparatus allows firefighters to practice the techniques of pumping water through various long lengths of hose, without requiring that long lengths of hose be utilized. Instead, because the firefighting training apparatus creates frictional resistance simulating a long length of hose, short lengths of fire hose may be used during practice exercises.

Figure 1:
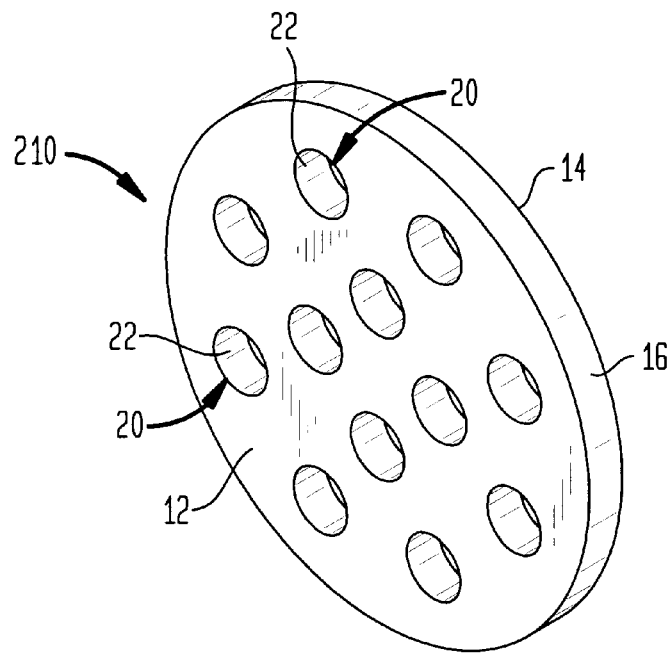
FIG. 1 is a perspective view of one embodiment of a firefighting training apparatus of the present invention.
Figure 2:
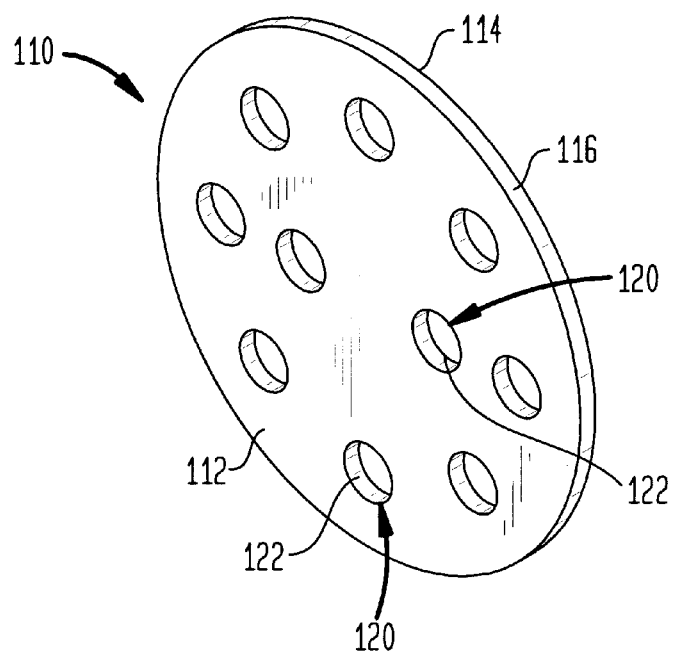
FIG. 2 is a perspective view of another embodiment of the firefighting training apparatus shown in FIG. 1.

As shown in FIG. 1, disk 10 comprises a first side 12, a second side 14, and a circumferential edge 16 extending thereabout. A plurality of apertures 20 extend through the disk from the first side 12 to the second side 14 to permit fluid to pass through the disk 10 through the apertures 20. Each aperture 20 is defined by a circumferential aperture wall 22. Likewise, referring to FIG. 2, where like referenced numerals referred to like elements, the disk 110 includes a first side wall 112, a second side wall 114, and a circumferential edge 116 extending thereabout. A plurality of apertures 120 extend through the disk, the apertures being defined by circumferential aperture walls 122. As can be readily seen, the amount of apertures, and the arrangement thereof, can vary in accordance with what is desired. The amount of fluid that is allowed to flow through the apertures 20 and 120 determine the characteristics of each disk and correspond to simulating flow characteristics of different length fire hoses. The disk acts as a flow restricting device. Accordingly, a disk with more apertures and a larger amount of area through which water can pass through the disk will simulate a shorter length hose whereas a disk having a lesser amount of apertures or a smaller amount of apertures will simulate a longer length of fire hose.

Figure 3:
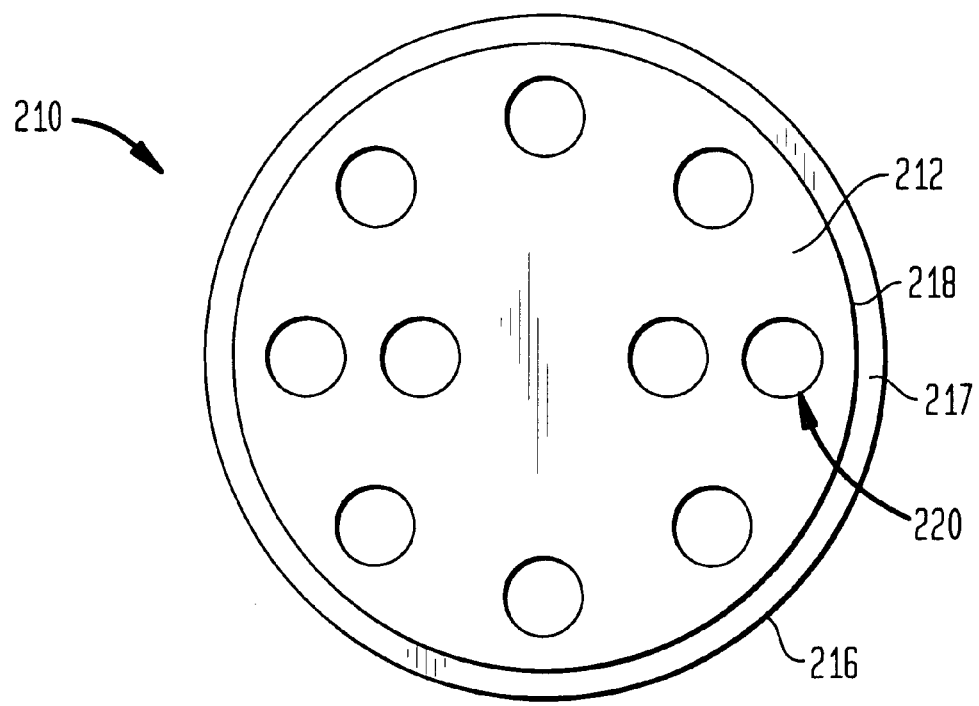
FIG. 3 is a front plan view of another embodiment of the firefighting training apparatus shown in FIG. 1.
Figure 4:
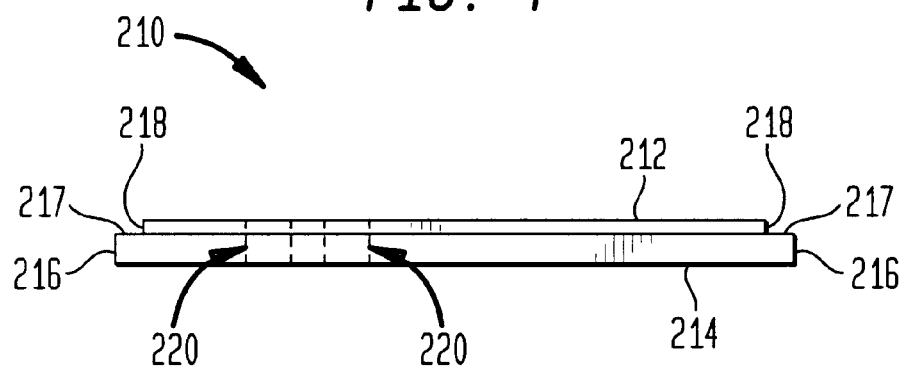
FIG. 4 is a side plan view of the firefighting training apparatus shown in FIG. 3.

Referring now to FIG. 3, another embodiment of the disk is indicated at 210. Again, in FIGS. 3 and 4, as well as FIG. 5, like referenced numerals refer to like elements. The disk 210 includes a front surface 212, a rear surface 214, a circumferential outer edge 216 extending thereabout, and a shoulder defined by circumferential edge 218 an outer intermediate circumferential faced 217. A plurality of apertures 220 extend through the disk to allow water to flow therethrough.

If desired, a single aperture 20 may be employed, or a gap could be formed along a side of the disk. To withstand water pressures measuring up to 1000 pounds-per-square-inch (abbreviated as psi), the disk is preferably formed from either steel, aluminum, a metallic alloy or a composite material. Importantly, it is desirable that the disk be formed of a material having a sufficient tensile strength to avoid plastic deformation under high pressures. Furthermore, to maintain its structural integrity over time, the disk not absorb or retain water. To provide resistance to rust, oxidation or corrosive decay, stainless steel is a preferred material.

The apertures 20 are formed to allow a predetermined number of gallons-per-minute (abbreviated as gpm) to flow through the firefighting training apparatus. The apertures 20 are the primary means of providing friction to stream of water passing through the fire hose. Various sets of differently sized apertures can be used permit various numbers of gallons-per-minute to flow through the firefighting training apparatus. Accordingly, the frictional resistance created by the firefighting training apparatus is dependent upon the geometric parameters of the disk 10, specifically the size, number and positioning of apertures 20 formed therethrough.

The length of fire hose (in feet) simulated by the firefighting training apparatus, and the number of gallons per minute flowing through the disk, is affected by either adjusting the size of each aperture 20, by increasing the number of apertures 20 through the circular plate 12, and/or by adjusting the positioning of the apertures 20 on the disk. Also, it should be noted that the gallons-per-minute which flow through the firefighting training apparatus directly vary according to pounds of water pressure supplied to the fire hose.

By way of example, a disk having 10 holes, each hole being 1¼ inch in diameter, was inserted into a hand held line having a 1⅛ inch tip. The desired flow rate at the tip is 250 gallons per minute (gpm) at 50 pounds per square inch (psi). 180 psi is the pressure leaving the pumper. The disk created approximately 130 psi of friction loss which is equivalent to 900 feet of hose. The same disk was used with a deck gun having a 1¾ inch tip fed by three lines. The desired flow rate through each line is 268 gpm at 80 psi for a total of approximately 800 gpm. The disk created approximately 130 psi friction loss equivalent to approximately 900 feet of a 2½ inch hose. The pressure leaving the pumper was approximately 210 psi.

Another disk having 7 holes, each hole having 5⁵⁄₁₆ of an inch diameter was used on a hand line with a 1⅛ inch tip which requires 250 gpm at 50 psi. The disk created approximately 100 psi of friction loss which is equivalent to approximately 700 feet of a 2½ inch hose. The same disk was used in a deck gun having a 1½ inch tip with two lines feeding the tip, each line handling 300 gpm for a total of 600 gpm. The disk created approximately 140 psi friction loss which is equivalent to approximately 700 feet a 2½ inch hose.

In a preferred embodiment of the invention, each aperture 20 is sized to have a diameter measuring approximately 0.25 inches. Further, in a preferred embodiment, the plurality of apertures cover approximately ten percent (10%) of the disk 10. If a disk 12 has ten (10) holes each of a 0.25 inch diameter, and a water pressure of 180 pounds per square inch is pumped to provide 250 gpm, a fire hose of nine hundred (900) feet in length is simulated.

Figure 5:
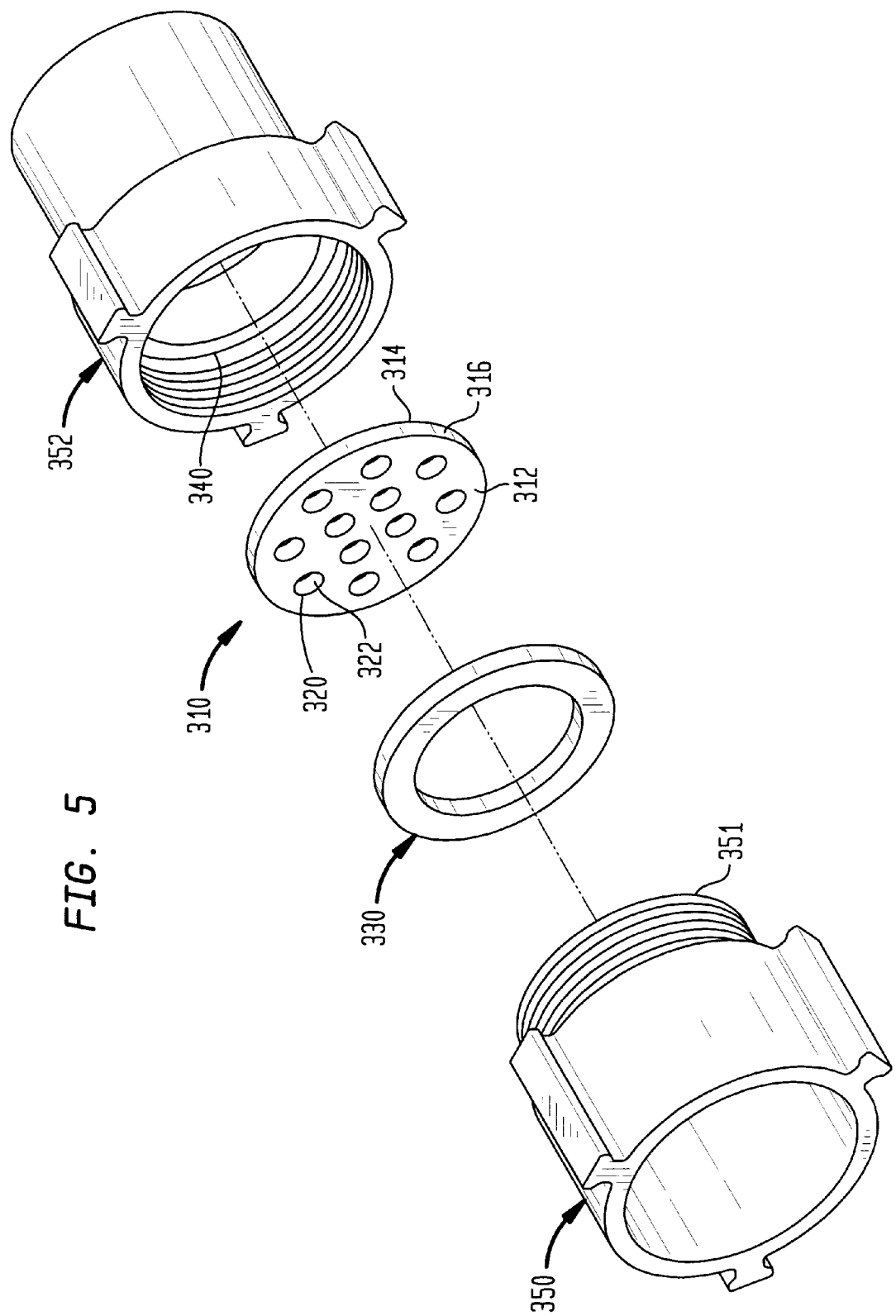
FIG. 5 is a perspective view of a firefighting training system of the present invention positioned within a fire hose coupling.

Referring to FIG. 5, it can be seen that the disk 310 fits within a fire hose coupling, so that it is directly within the path of the pressurized water. The coupling includes a male component 350 and a female component 352 and can connect two lengths of fire hose together, or can connect the fire hose with a nozzle, or can connect the fire hose to a pump means.

The coupling ends 350 and 352 are threadably connectable. A gasket 330 fits within ends 350 and 352 to form a third tight seal. Accordingly, a fire hose can thereby be connected to a pump, a nozzle or another length of fire hose to create a fire hose of any desired length. The disk 310 of the present invention is sized to be positioned within the coupling and retained therein when the coupling is coupled to a nozzle, pump or another fire hose. One side 314 of the disk 310 contacts a rim 340 within the female coupling 352 and the male coupling end 351 bears against the other side 312 of the disk 310. If the disk has a shoulder, same can be used to locate and retain the disk in a proper position within the coupling. The gasket 330 is placed over the disk 310 to provide a water tight seal.

The firefighting training method of the present invention relates to training a firefighter to operate a pump to deliver a proper amount of water to a nozzle at the end of a fire hose. With the present invention, a long length of hose can be simulated by using the apparatus of the present invention in connection with a relatively short length of fire hose. The training method comprises the steps of interconnecting a length of hose with a pump at one end and a nozzle at the other end; inserting a disk at the junction of the fire hose and pump, or at the junction of the fire hose and nozzle; delivering various amount of water from the pump through the hose to obtain a desired flow rate of water from the nozzle of the fire hose to simulate the amount of water required to be delivered through a hose of a longer length. The method further comprises using different disks having different flow restriction characteristics and continuing to practice delivering a proper amount of water through the hose. In this manner, a plurality of disks can be used, each simulating a given hose length, so that a firefighter can practice delivering water through various hose lengths without the need for laying out the hose length.

Having thus described the invention in detail, it is to be understood that the forgoing description is not intended to limit the spirit and scope thereof. What is desired to be protected by Letters Patent is set forth in the appended claims:

1. A firefighting training system comprising:
   at least one relatively short length of a fire hose;
   pump means for pumping water through at least one relatively short length of fire hose;
   nozzle means for dispensing water from at least one relatively short length of fire hose;
   first connection means connecting at least one relatively short length of fire hose to the pump means;
   second connection means connecting the nozzle means to at least one relatively short length of fire hose;
   a plurality of flow disrupters one of the plurality of flow disrupters positioned within the system
   flow said disrupters positioned within the system for simulating water pressure loss associated with the flow of water through a relatively long length of fire hose without the necessity of using a relatively long length of fire hose.

2. The system of claim 1 wherein the flow disrupting means comprises a disk having one or more passages therethrough.

3. The system of claim 2 wherein the flow disrupters are positioned within the first connection means.

4. The system of claim 2 wherein the flow disrupting means is positioned within the second connection means.

5. The system of claim 2 wherein each of the plurality of disks each having different sized passage ways therethrough for simulating the flow of water through different lengths of fire hose.

6. A method of training firefighters to deliver a proper amount of water through a length of hose to a nozzle, without the need for using a full length of hose, comprising the steps of:

attaching a relatively short length of hose to a pump at one end and to a nozzle at another end to create a water delivery system;

simulating water pressure loss associated with a relatively long length of hose by interconnecting a flow restricting device with the water delivery system;

delivering a proper amount of water through the water delivery system including a relatively short length of hose and the flow restricting device to practice delivering water through a relatively long length of hose without the necessity of using a relatively long length of hose;

adjusting the characteristics of the flow restricting device to simulate pressure loss associated with a different, relatively long length of hose, without the necessity of using a relatively long length of hose; and continuing to deliver water through the water delivery system including a relatively short length of hose to simulate delivering water through a different, relatively long length of hose, without the necessity of using a relatively long length of hose.

7. The method of claim 6 wherein the flow restricting device comprises one of a plurality of disks having a plurality of apertures, and the step of changing the characteristics of the flow restriction device comprises removing a first disk from the water delivery system and inserting a second disk having a different flow characteristic into the water delivery system.

8. The method claim 7 wherein the step of interconnecting one of the plurality of disks with the water delivery system comprises placing the disk within the end of the hose and coupling the hose with the nozzle or the pump to retain the disk within the hose coupling.

* * * * *